2 Sheets--Sheet 2.
A. ALBRIGHT.
Rubber-Coated Articles for Carriages and Harness Trimmings.
No. 150,997. Patented May 19, 1874.
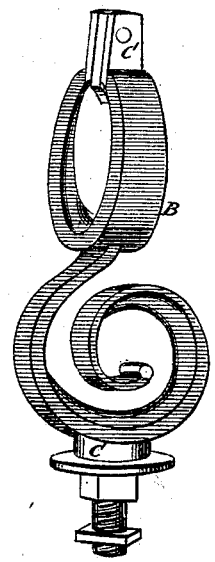
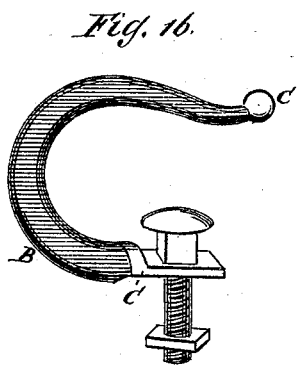
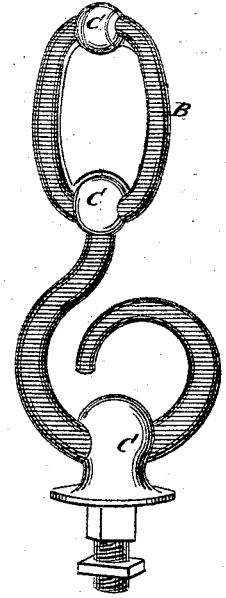
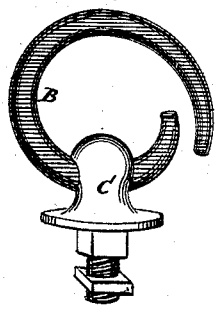
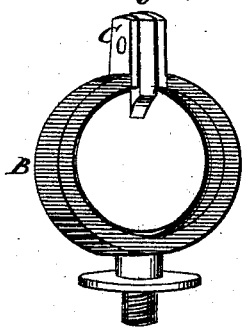
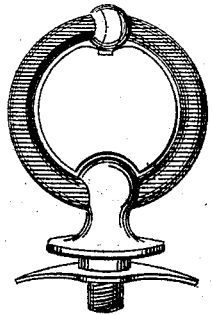
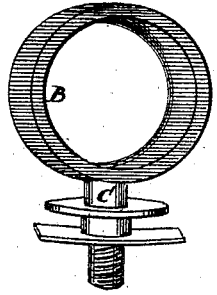
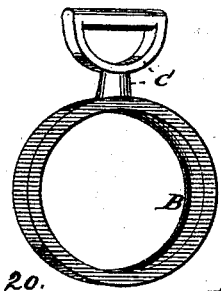
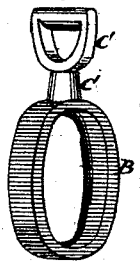
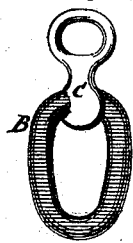
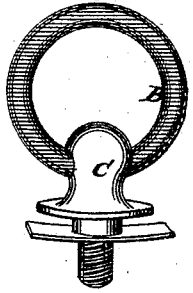
Witnesses.
Francis Acre Bowen
V. C. Clayton
Inventor.
Andrew Albright

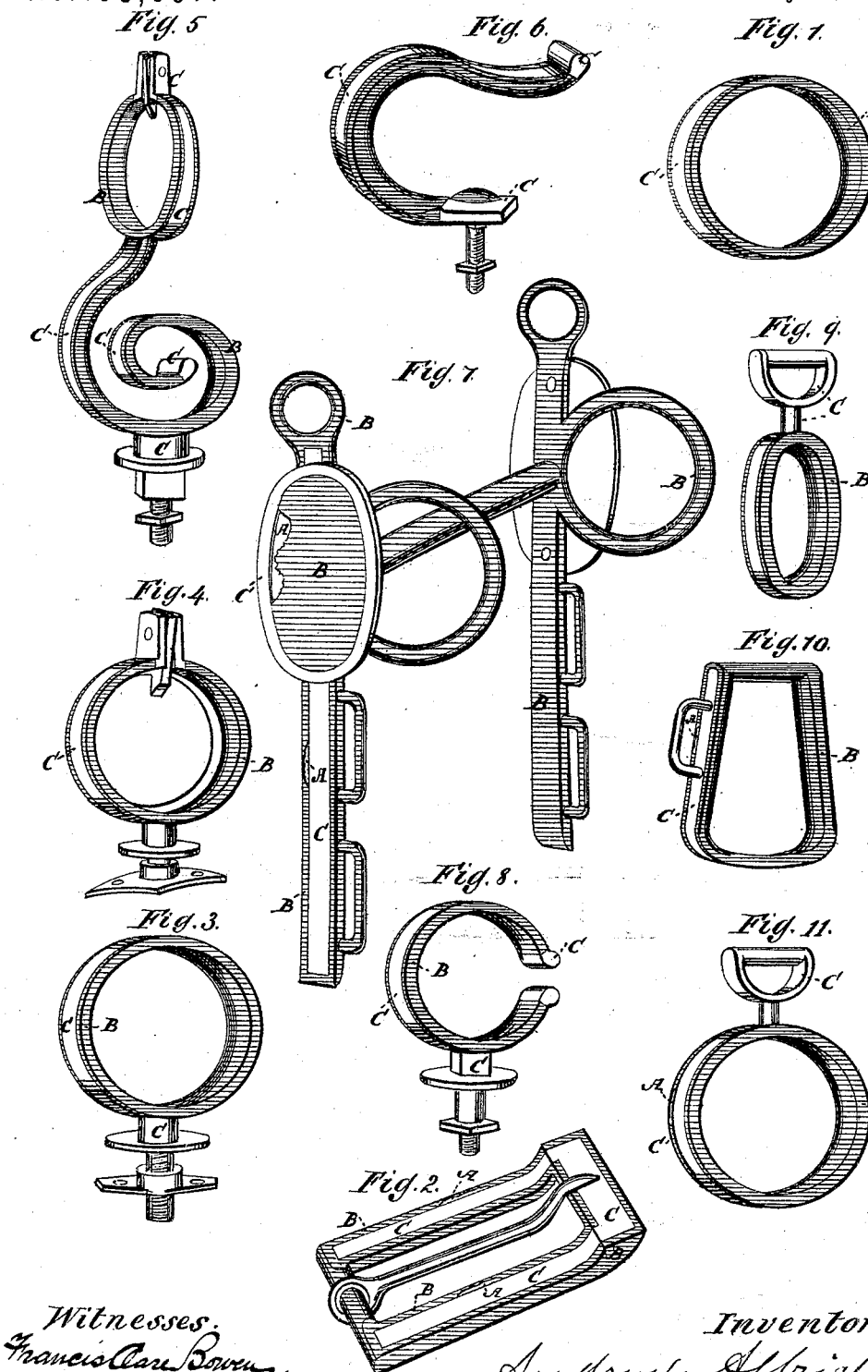

UNITED STATES PATENT OFFICE.

ANDREW ALBRIGHT, OF NEWARK, NEW JERSEY.

IMPROVEMENT IN RUBBER-COATED ARTICLES FOR CARRIAGE AND HARNESS TRIMMINGS.

Specification forming part of Letters Patent No. 150,997, dated May 19, 1874; application filed January 27, 1874.

*To all whom it may concern:*

Be it known that I, ANDREW ALBRIGHT, of Newark, in the county of Essex, and in the State of New Jersey, have invented certain new and useful Improvements in the Manufacture of Rubber-Coated Articles; and I do hereby declare that the following is a full, clear, and exact description thereof, reference being had to the accompanying drawings forming a part of this specification.

My invention relates to rubber-coated and plated articles so made as to combine strength and durability, and at the same time a highly ornamental and tasteful appearance; and the invention is especially applicable to coated and ornamented harness and carriage trimmings, as hereinafter described.

The body of the article, which gives strength, whether ring, buckle, hook-terret, hames, carriage-handle, or the like, is made of metal. I prefer for this purpose oroide, white metal, such as German silver, or malleable cast-iron. The coating which protects and also ornaments is made in part of vulcanized rubber, or of other known vulcanizable gum or compressible composition, applied as described in the following-named Letters Patent heretofore granted to me—No. 62,106, reissue Nos. 5,155, 5,156, 5,172, and 5,173, and Nos. 137,872 and 137,873—while the other part of said coating is a contrasting metal slow of oxidation, such as gold, silver, or nickel, applied by plating, by battery, or otherwise.

In the above-referred-to patents I have described in detail harness and carriage trimmings made of metal, and coated entirely with vulcanized rubber, and also the processes and dies by which such articles are to be manufactured, and also stated that by the use of such dies other suitable compressible compositions beside rubber can be used for coating such articles.

This invention differs from those previous ones in that only a part of the coating is of rubber or such composition, while the other part is of plating. The ornamental effect of the contrast between that part of the coating which is of hard rubber, or other such composition, and that part which is silver, gold, or nickel plating, is very striking, beautiful, and effective.

When a buckle or other article is to be made with the contrasted coating of hard rubber and plating I use this or a similar process: The metallic article is coated with plastic rubber on the parts designed to have a hard-rubber coating, and is then vulcanized, after which it is finished by dies or otherwise. The plating is then applied by battery or otherwise to the proper parts not covered with rubber. The article with its contrasted coating is then burnished or finished.

I may substitute for rubber pyroxyline, celluloid, or other compressible composition having the appearance of rubber. In such a case the composition should be softened by heat, and formed or finished in suitable dies. The parts not coated by the composition are then protected with plating, as above described.

The drawings show a large number of articles of this new manufacture. In the various figures, A represents the metallic core; B, the rubber or composition coating; C, the plated coating.

I have represented in the drawings three different patterns or modes of arranging the "contrasted coating:" Figures 1 to 11 show the "imperial" pattern. Figs. 12 to 17 show the "ball" pattern. Figs. 18 to 22 show the "ribbon" pattern.

Fig. 1 shows a ring. Fig. 2 shows a buckle. Fig. 3 shows a terret; Fig. 4, a "fly-terret;" Fig. 5, a "union fly-hook;" Fig. 6, a bolt-hook; Fig. 7, a bit; Fig. 8, a pad-hook; Fig. 9, a swivel; Fig. 10, a breeching-dee; and Fig. 11 is a martingale-ring. All these figures are in Sheet I, and are of the same pattern. Fig. 12 is a terret; Fig. 13, a fly-terret; Fig. 14, a swivel; Fig. 15, a pad-hook; Fig. 16, a bolt-hook; and Fig. 17, a union fly-hook, all of the ball pattern. Fig. 18 is a terret; Fig. 19, fly-terret; Fig. 20, swivel; Fig. 21, a martingale-ring; and Fig. 22 is a union fly-hook, all of the ribbon pattern.

When the body of the trimming, such as a buckle and the like, is made of oroide or German silver, or other slow-oxidizing metal, that part which is exposed to view, and not coated with rubber or other composition, may receive a high surface finish, and plating be omitted. In this way, also, the contrasted coating may be obtained.

I claim—

1. Harness and carriage trimmings having their core or body made of metal and coated, one part with vulcanized rubber or like-appearing composition, and the other part coated with slow-oxidizing metal, substantially as herein described.

2. Harness and carriage trimmings having the core of oroide, German silver, or other slow-oxidizing metal, and a partial coating of rubber or composition, and having a part of the metal exposed and provided with a surface finish.

In testimony that I claim the above-described invention I have hereunto signed my name this 16th day of January, 1874.

ANDREW ALBRIGHT.

Witnesses:
J. C. CLAYTON,
FRANCIS C. BOWEN.